Patented Oct. 21, 1941

2,259,641

UNITED STATES PATENT OFFICE 2,259,641

NITROSO-BETA NAPHTHOL IRON PIGMENT AND A PROCESS OF MAKING IT

Samuel C. Horning, Newark, N. J., assignor to E. I. du Pont de Nemours & Company, Wilmington, Del., a corporation of Delaware No Drawing. Application May 26, 1939, Serial No. 275,797

17 Claims. (Cl. 260—439)

This invention relates to the production of improved colored pigments comprising iron complexes of nitroso-beta-naphthol, and more particularly to the production of pigment green colors and the products thereof having such excellent texture characteristics as to be adaptable to all manners of pigment use.

Many well-known methods exist for the production of iron complex of nitroso-beta-naphthol pigments. The disclosure of United States Patent No. 1,529,891 is particularly useful for producing a pigment color of this character having a brilliant green hue (known commercially as Pigment Green B), through reaction of nitroso-beta-naphthol, preferably in the form of its bisulfite compound, with iron salts, particularly ferric oxide salts; or, preferably, with ferrous salts, provided used in less quantity than corresponds to 1 atom of iron to each 2 molecular proportions of nitroso-beta-naphthol. Such treatment is conducted in the presence or absence of substrates at ordinary or elevated temperatures and preferably in the presence of dispersing agents, such as Turkey red oil. Although the resultant green pigment exhibits good fastness towards light and alkalies, it is relatively hard in texture and very difficult to disperse, especially in printing ink media. This hardness characteristic is especially pronounced and severe in instances where the pigment paste is permitted to dry out during processing. When this occurs, the resultant product becomes almost worthless as a pigment. Accordingly, preparation of a useful, dry form of the pigment complex has been considered impossible heretofore, and to preserve its pigment qualities, it has been considered essential that the pigment prior to use be maintained in the form of an aqueous paste consisting, usually, of approximately 25% solids content.

Use of these iron compounds of nitroso-beta-naphthol has been heretofore restricted to those applications in which it is possible to employ aqueous pigment pastes, i. e., the beater dyeing of paper, paper coating mixtures, casein paints, and the coloring of rubber latex. Those requiring the pigment to be in relatively dry form prior to use, e. g., printing inks, coating compositions (paints, enamels, etc.), or linoleum manufactures, have not been considered as useful applications for said pigments. Employment of aqueous pastes of pigments suffers from many disadvantages, including excessive transportation costs due to the large amount of water which they contain, the danger of freezing in cold weather, and the difficulties which are encountered not only in maintaining a uniform solids content therein, but in maintaining uniform tinctorial qualities in the pigment.

It is among the objects of this invention to overcome these and other difficulties afforded in prior iron complexes of nitroso-beta-naphthol pigments, and to provide a novel and improved pigment of this type adapted to exhibit satisfactory texture characteristics under all conditions, to render the same useful for every manner of pigment employment. Further objects include: the provision of a useful and convenient process which inherently imparts these and other desirable characteristics to said pigments and enables one to prepare said iron complexes in finished, dry state, possessed of satisfactory texture. Other objects and advantages will appear from the ensuing description of the invention.

These and other objects are attainable in my invention which broadly comprises subjecting a pigment-useful substance, comprising an iron compound of nitroso-beta-naphthol, to treatment with a substantially colorless organic amine.

In a more specific embodiment, the invention comprises treating an aqueous suspension of a green color lake formed by reacting nitroso-beta-naphthol with a ferrous salt in less quantity than corresponds to 1 atom of iron to each 2 molecular proportions of nitroso-beta-naphthol, with an aqueous solution of a salt of a substantially colorless organic amine.

In one practical and preferred adaptation, the pigment Green B iron complex is prepared in accordance with any well-known procedure or in accordance with the methods described in said United States Patent No. 1,529,891. Upon preparation, the resultant pigment is preferably isolated as an aqueous paste of approximately 25% dry content. This paste is then reslurried with water to a consistency suitable for agitation and a relatively small or minor quantity, say, from about 1% to about 10%, based on the weight of the dry pigment, of a substantially colorless organic amine is admixed therewith. Preferably, the amine is added to the slurry in the form of an aqueous solution of its salt, such as the hydrochloride, iodide, nitrate, etc. The resultant mixture is then thoroughly agitated, thereafter filtered and the pigment product dried in accordance with conventional drying procedures. The dried, finished product is of greatly improved, distinctly soft texture, of excellent fastness towards light and alkalies, and readily adapted for all manners of commercial pigment applications, such as the various types alluded to above.

In order that the invention may be more clearly understood, the following illustrative examples are given, none of which, however, are to be considered as in limitation of my invention:

Example I

Pigment Green B (Color Index No. 2) (also Schultz No. 2), a ferrous complex of nitroso beta naphthol, is first prepared as follows:

Beta naphthol, previously dissolved in dilute alkali, is nitrosated by the addition of sodium nitrite and a mineral acid. Any excess acid is neutralized, or eliminated by filtration, and the nitroso beta naphthol converted to a bisulfite ester by the addition of sodium bisulfite. The bisulfite ester is soluble in water and any insoluble impurities may be eliminated at this point by filtration. A small amount of Turkey red oil is added and the pigment is then prepared by adding a ferrous salt, such as ferrous sulfate, in the ratio of about one atom of iron for every 3 molecules of nitroso beta naphthol. The precipitation is completed by the addition of a dilute alkali such as sodium carbonate and the pigment is isolated as an aqueous paste by filtration and washing.

400 parts of the pigment paste (100 parts of dry color) thus obtained are diluted with approximately 600 parts of water to give a slurry of approximately 10% solids content which may be readily agitated. To this paste is added a solution of 5 parts of diphenyl guanidine in the theoretical quantity of dilute hydrochloric acid, and the mixture thoroughly agitated. It is then filtered and dried by conventional means. The resulting dry product (approximately 105 parts) is relatively soft, of excellent texture, and readily dispersible in oil vehicles and in rubber in which the pigment is especially valuable.

Example II 400 parts of the paste of Example I are diluted with water as in said example and a solution of 2.5 parts dibutylamine in the theoretical quantity of dilute hydrochloric acid are added thereto. After filtration and drying, the dry pigment is substantially equivalent to that of Example I.

Example III 400 parts of the paste of Example I are diluted with water as in said example and to it is added a solution of 5 parts of aniline in the theoretical quantity of dilute hydrochloric acid. After filtration and drying, the resulting pigment is relatively soft and readily dispersible in paint and enamel coating compositions.

Example IV 400 parts of the paste of Example I are diluted with water as in said example and a solution of 10 parts of diphenyl guanidine in dilute hydrochloric acid is added thereto. The pigment resulting therefrom, after filtration and drying, is somewhat superior in texture to that of Example I, but its strength becomes slightly affected due to the diluting action of the relatively large amount of diphenyl guanidine added. However, the product readily disperses in coating compositions.

Example V

A slurry of Pigment Green B is prepared as in Example I except that, after the addition of the alkali and a subsequent period of development, it is made slightly acid with acetic acid. To a portion of this acidified slurry equivalent to 100 parts of dry pigment is added 5 parts diphenyl guanidine in a dilute solution of acetic acid. The slurry is filtered and dried and the resulting pigment is quite soft and readily dispersed in the usual coating composition vehicles. This product was found to filter much more rapidly than that of Example I.

While colorless organic amines of specific type have been employed in the foregoing examples and in particular quantities, the invention is not limited to such specific amines or designated amounts, nor to the particular points of addition or operating conditions specified. In general, I contemplate using all types of organic amines or bases, provided the same are substantially colorless in character. This latter property is a very important factor, since it is essential that whatever type of amine shall be employed it must not exert any influence upon, nor affect or modify the hue, shade or brilliance, etc., of the green color or lake under treatment. Therefore, all types of colorless organic amines, or admixtures of the same, may be usefully employed in the invention, and whether of monoalkylated or primary character; disubstituted, or of secondary nature; or completely alkylated or tertiary in type; and furthermore, whether the secondary or tertiary types contain alkyl groups which are identical or unlike. Although all types, including gaseous or relatively low molecular weight amines are useful in the invention, I prefer to employ those which are substantially liquid at ordinary or room temperature, or those relatively high in molecular weight, substantially solids at room temperature and soluble in aqueous media such as water, or in acids or alcohols. In addition to the specific amines mentioned above, examples of other useful types include the following: lauryl amine, urea, dicyandiamide, glucamine, triphenyl guanidine, toluidine, pyridine and dipyridyl, etc.

As has been stated, relatively minor amounts of the colorless amine are usually employed in the invention, and ranging from, say, about 1 to 10% and preferably from, say, about 3 to 5%, based on the weight of the dry pigment. Use of these amounts will ordinarily suffice to obtain optimum benefits in most practical adaptations of the invention. Although larger quantities may be employed, if desired, no additional benefits appear to accrue thereby, and accordingly the use of such minor proportions is therefore preferred and recommended.

Pigment Green B is known and described in the literature as an iron complex of nitroso-beta-naphthol. In said United States Patent No. 1,529,891 it is indicated that the iron is preferably present therein in an amount not exceeding the ratio of substantially 1 mol of iron to 3 mols of nitroso-beta-naphthol. On such basis it appears that the pigment may comprise a ferric salt of nitroso-beta-naphthol. Preferably and conveniently, however, ferrous and not ferric salts are employed as precipitants in the manufacture of such pigment, especially if a pigment exhibiting maximum strength, hiding power, etc., is desired. Some evidence appears to exist which appears to demonstrate a small amount of sodium is present in commercial Pigment Green B, and in a somewhat constant amount, e. g., substantially that equivalent to 1 atom of sodium for each 3 mols of nitroso-beta-naphthol. Thus, it might be suggested that Pigment Green B could be regarded as a ferrous complex of nitroso-beta-naphthol in which 1 atom of iron appears to be bound by primary and secondary valences to 3 mols of nitroso-beta-naphthol. In such instance, the empirical formula might be written Na(Fe(C₁₀H₇NO₂)₃), with the ionizable sodium ion replaceable by any other positive ion. It thus appears that the organic amine employed in my invention may function to replace the sodium present in the Pigment Green B molecule and in proportion to the amount of amine used. Although this appears reasonable and is deducible from analytical data presently available to me, which indicates that sodium loss in my novel pigment products is substantially equivalent to the amount of amine used, I do not wish to be limited to such theory nor to any other which may be proposed in possible explanation.

As has been noted, heretofore it has been impossible to prepare Pigment Green iron complexes in a dry form suitable for use as a pigment. Through the practice of this invention such dry product is made available for the first time. The advantages afforded by such dry pigment are apparent in any attempt to incorporate the product into commercial coating compositions. Prior iron complexes or pigment greens, no matter how finely ground, could not be completely dispersed in printing ink vehicles, paint vehicles, rubber, or the like. In every instance, the resulting compositions, although green in color, were unsatisfactory, very dirty, and resulted in a grayish appearance. The products of this invention are, on the other hand, readily dispersible in these compositions, are completely satisfactory, and result in clean green shades of much beauty and high strength.

While I have described the invention in reference to its preferred embodiment involving the particular treatment of ferrous iron complexes containing 1 atom of the color-forming metal (iron) for each 3 mols of nitroso-beta-napthol, as taught in said United States Patent No. 1,529,891, the beneficial effects of my invention are also obtainable when other but similar forms of such iron complex pigments are subjected to substantially the same treatment. Thus, the invention may be also advantageously applied to the treatment of the green lake pigments which comprise the multi-metal iron complexes of United States Patent No. 1,993,971 to MacQueen or the pigment greens of United States Patent No. 2,127,374 to Allen et al., produced by reacting with nitroso-beta-naphthol, preferably in the form of its bisulfite compound, a ferrous salt of a polycarboxylic or hydrocarboxylic acid, in the proportion of at least 1 atom of iron for each 2 molecular proportions of nitroso-beta-naphthol. Accordingly, it will be understood that by the term "iron complex of nitroso-beta-naphthol", as used here and in the appended claims, I intend to include all such various forms or types of pigment green colors or lakes.

I claim as my invention:

1. A process for producing a dry soft-textured pigment comprising an iron complex of nitroso-beta-naphthol, comprising reacting said pigment while in aqueous suspension with a colorless organic amine and thereafter drying and recovering the resulting product.

2. A process for producing a dry soft-textured pigment comprising a ferrous iron complex of nitroso-beta-naphthol comprising reacting said pigment while in aqueous suspension with a minor amount of a colorless organic amine and thereafter dehydrating and recovering the resulting product.

3. A process for producing a dry soft-textured pigment comprising a ferrous iron complex of nitroso-beta-naphthol, comprising subjecting said pigment while in aqueous suspension to treatment for reaction with from about 1 to 10%, based on the weight of the dry pigment, of a colorless organic amine, and then drying and recovering the resulting product.

4. A process for producing a dry, soft-textured pigment comprising a ferrous iron complex of nitroso-beta-naphthol containing less than 1 atom of iron to each 2 molecular proportions of nitroso-beta-naphthol, comprising subjecting said pigment while in aqueous suspension to treatment for reaction with a minor quantity of a salt of a colorless organic amine, and then drying and recovering the resulting product.

5. A process for producing a dry soft-textured pigment comprising a ferrous iron complex of nitroso-beta-naphthol comprising reacting said pigment while in aqueous suspension with substantially 1 to 10% of diphenyl guanidine and dehydrating and recovering the resulting product.

6. A process for producing a dry soft-textured pigment comprising a ferrous iron complex of nitroso-beta-naphthol comprising reacting said pigment while in aqueous suspension with substantially 1 to 10% of dibutyl amine and dehydrating and recovering the resulting product.

7. A process for producing a dry, soft-textured pigment comprising a ferrous iron complex of nitroso-beta-naphthol comprising reacting said pigment while in aqueous suspension with substantially 1 to 10% of aniline.

8. As a new product, a dry soft-textured pigment comprising an iron complex of nitroso-beta-naphthol containing as an essential ingredient the reaction product of a colorless organic amine with said pigment.

9. As a new product, a dry soft-textured pigment comprising an iron complex of nitroso-beta-naphthol containing as an essential ingredient a minor quantity of the reaction product of diphenyl guanidine with said pigment.

10. As a new product, a dry soft-textured pigment comprising an iron complex of nitroso-beta-naphthol containing as an essential ingredient a minor quantity of the reaction product of dibutyl amine with said pigment.

11. As a new product, a dry, soft-textured pigment comprising an iron complex of nitroso-beta-naphthol containing as an essential ingredient a minor quantity of the reaction product of aniline with said pigment.

12. As a new product, a dry, soft-textured pigment comprising a ferrous iron complex of nitroso-beta-naphthol containing less than 1 atom of iron to each 2 molecular proportions of nitroso-beta-naphthol, containing as an essential ingredient a minor proportion of a colorless organic amine reacted therewith.

13. As a new product, a dry, soft-textured pigment comprising a ferrous iron complex of nitroso-beta-naphthol containing less than 1 atom of iron to each 2 molecular proportions of nitroso-beta-naphthol, containing as an essential ingredient from about 1 to 10%, based on the weight of the pigment, of a colorless organic amine reacted therewith.

14. As a new product, a dry, soft-textured pigment comprising a ferrous iron complex of nitroso-beta-naphthol in which the iron present is in the ratio of substantially 1 mol of iron to each 3 mols of nitroso-beta-naphthol containing as an essential ingredient from about 1 to 10%, based on the weight of the pigment, of a colorless organic amine reacted therewith.

15. As a new product, a dry pigment of soft texture comprising a ferrous iron complex of nitroso-beta-naphthol in which the iron present is in the ratio of substantially 1 mol of iron to each 3 mols of nitroso-beta-naphthol containing as an essential ingredient from about 3 to 5%, based on the weight of the pigment, of a colorless organic amine reacted therewith.

16. As a new product, a dry, soft-textured pigment comprising a ferrous iron complex of nitroso-beta-naphthol in which the iron is present in the ratio of substantially 1 mol of iron to each 3 mols of nitroso-beta-naphthol, containing as an essential ingredient and based on the weight of the pigment from about 3 to 5% of aniline reacted with said pigment.

17. As a new product, a dry, soft-textured pigment comprising a ferrous iron complex of nitroso-beta-naphthol in which the iron is present in the ratio of substantially 1 mol of iron to each 3 mols of nitroso-beta-naphthol, containing as an essential ingredient and based on the weight of the pigment from about 3 to 5% of diphenyl guanidine reacted with said pigment.

SAMUEL C. HORNING.